(12) United States Patent
Pylinski

(10) Patent No.: US 9,102,460 B2
(45) Date of Patent: Aug. 11, 2015

(54) DELIVERY AND DISPENSE HOPPER

(76) Inventor: Thaddeus Pylinski, Bumpass, VA (US)

( * ) Notice: Subject to any disclaimer, the term of this patent is extended or adjusted under 35 U.S.C. 154(b) by 293 days.

(21) Appl. No.: 13/471,680

(22) Filed: May 15, 2012

(65) Prior Publication Data

US 2013/0004275 A1    Jan. 3, 2013

Related U.S. Application Data

(60) Provisional application No. 61/486,403, filed on May 16, 2011.

(51) Int. Cl.
| | | |
|---|---|---|
| *B65D 88/30* | (2006.01) | |
| *B60P 1/43* | (2006.01) | |
| *B28C 7/16* | (2006.01) | |
| *B65D 90/58* | (2006.01) | |
| *B65D 90/66* | (2006.01) | |

(52) U.S. Cl.
CPC ................ *B65D 88/30* (2013.01); *B28C 7/161* (2013.01); *B60P 1/43* (2013.01); *B65D 90/587* (2013.01); *B65D 90/66* (2013.01)

(58) Field of Classification Search
CPC .......... B60P 1/43; B65D 90/52; B65D 90/54; B65D 88/26; B65D 88/30
USPC ................................ 414/607; 296/154, 183.1
See application file for complete search history.

(56) References Cited

U.S. PATENT DOCUMENTS

| | | | |
|---|---|---|---|
| 2,459,978 A | 1/1949 | Wagner et al. | |
| 3,598,266 A | 8/1971 | Fisher | |
| 4,068,771 A * | 1/1978 | Zimmerman | 414/420 |
| 4,798,510 A | 1/1989 | Lazenby | |
| 5,004,022 A | 4/1991 | Carlsson | |
| 5,182,057 A | 1/1993 | Johnson | |
| 5,439,147 A | 8/1995 | Bitschnau | |
| 5,829,949 A | 11/1998 | Brown | |
| 5,848,871 A * | 12/1998 | Thiessen | 414/607 |
| 5,885,053 A | 3/1999 | Deye | |
| 5,938,398 A | 8/1999 | Brown | |
| D459,365 S | 6/2002 | Myers et al. | |
| 6,623,234 B1 * | 9/2003 | Herring et al. | 414/528 |
| 6,969,226 B2 | 11/2005 | Raley | |
| 7,281,838 B2 | 10/2007 | Melchiorre | |
| 7,314,342 B2 * | 1/2008 | Kerwin | 414/722 |
| D630,653 S | 1/2011 | Meritt | |
| 8,251,014 B2 * | 8/2012 | Hamilton | 119/61.54 |
| 8,550,542 B1 * | 10/2013 | Booher et al. | 296/183.1 |
| 8,573,156 B2 * | 11/2013 | Gates | 119/53 |
| 2009/0067965 A1 * | 3/2009 | Martin et al. | 414/408 |

FOREIGN PATENT DOCUMENTS

| | | | |
|---|---|---|---|
| FR | 2 352 920 A1 | 12/1977 | |
| FR | 2 848 139 A1 | 6/2004 | |

* cited by examiner

*Primary Examiner* — Saul Rodriguez
*Assistant Examiner* — Ashley Romano
(74) *Attorney, Agent, or Firm* — Millen, White, Zelano, Branigan, P.C.

(57) ABSTRACT

The invention relates to an open top generally rectangular hopper for the delivery and discharge of a flowable material. The hopper has lower side walls which converge inwardly and downwardly and are joined to a bottom plate. The hopper also has a bracket mounted on the exterior of the back vertical wall for securing the hopper container to the arm of a transport vehicle. A discharge chute is located on the lower portion of the front vertical wall about equidistant between the downwardly and inwardly converging lower sidewalls. In certain embodiments, an anti-spill lip surrounds the perimeter of the hopper opening and is angled between 30° to 90° inwardly from the vertical walls.

15 Claims, 5 Drawing Sheets

DELIVERY AND DISPENSE HOPPER

BACKGROUND

This application claims priority to U.S. Provisional Application Ser. No. 61/486,403, filed May 16, 2011. More specifically, it is directed to a low cost dispensing hopper apparatus that is attachable to the arms of a loader vehicle.

A viscous or flowable material such as, concrete is typically delivered to a work site by a concrete truck which has been loaded with material at a remotely located mixing facility. Concrete trucks are relatively large and are thereby inherently limited in their ability to deliver mixed material to its final destination where it is dispensed into forms constructed of wood or other material or earthen forms, such as trenches or holes. Even if the final destination is accessible, the delivery system of a cement truck may not be efficient in terms of lost time and wasted material. Typically however, the trucks carrying the material are unable to reach the pour site and are unable to properly distribute the material. In such a case, the distribution of the flowable material typically requires the use of pumps and/or wheelbarrows and substantial manpower. Due to physical limitations, each wheelbarrow can transport a limited amount of material. Accordingly, the labor costs and time required for completing a pour are substantial. Additionally, because materials such as concrete cure rapidly, failure to complete the pour rapidly may result in wasted material or a faulty pour. Thus, a relatively fast distribution of the material reduces the risk of material waste and a faulty pour.

Another method of delivering flowable material to a form or fencepost hole is via hand carried buckets filled with the flowable material. This method of delivery was required when delivery was needed in areas having steep hills or swampy terrain. While the use of hand carried buckets has provided for the accurate placement of materials into forms and fencepost holes, it is both time consuming and labor intensive.

In addition to wasting human resources, prior methods of concrete delivery to remote locations are generally not cost effective since less than complete loads of concrete must be ordered. Ordering less than minimum material loads often incurs a delivery charge by the concrete supplier which also must be accounted for in the overall cost of the project.

As used herein, loader vehicles include "skid-steer" loaders, backhoes, forklifts, sky-lifts, track-hoes, tractor loaders and other vehicles that include a hydraulic system and that are capable of removably receiving a hopper attachment thereon. For ease of description, the following discussion will primarily focus on skid-steer loaders. However, other types of loader vehicles can be used with the hopper of the present invention.

Generally, skid-steer loaders are vehicles designed to operate in rough terrain and perform a variety of functions. The loader vehicles include loader frame arms that extend in front of the loader vehicle and that may be raised and lowered by hydraulic cylinders. The ends of the frame arms include releasable attachments that permit rapid connection of auxiliary equipment to the loader vehicle. Many loaders include operator enclosures. In many designs, in order to open the door of such enclosure the loader arm must be lowered to ground level.

Consequently, skid-steer loaders have evolved into multi-function vehicles as more and more attachments for the loader vehicles have been designed. Examples of attachments include dumping buckets, stump grinders, sweepers, trenchers, backhoes, angle blades, pallet forks, among many others.

Containers adapted to a skid steer (or other loader) are known in the art; however, spillage of a flowable material is common resulting in additional wasted material. Furthermore, containers which have discharge chutes at the bottom make it difficult for the operator to visualize the correct placement of the discharge opening and require greater ground clearance. Perhaps the most important shortfall of the prior art containers in pouring a flowable material, is the elongated design of the bucket. Generally, the buckets extend the full width of the loader vehicle to promote increased capacity. Completing a pour, however, frequently requires precision in directing the flowable material to the pour site. Often the desired pour location is a small or narrow area such as a post hole. Accordingly, the standard dumping bucket cannot complete a large number of the jobs involving a flowable material. Yet another disadvantage of prior art containers is the high placement of the mounting brackets. On loaders with operator enclosures, if the mounting brackets are placed too high on the loader an operator must completely detach the attachment in order to open the enclosure door. Thus, more than one person is required. Furthermore, if the mounting brackets are too high the stability of the loader with a full container is compromised. This is especially true on rough or uneven terrain.

Additionally, prior art containers are subject to spillage of contents on rough or uneven terrain.

Like skid steer loaders, other loader vehicles typically include loader frame arms that extend in front of the loader vehicle which may be raised and lowered by hydraulic cylinders. The arms typically have releasable attachments that permit rapid connection of auxiliary equipment to the loader vehicle.

An improved method of delivering concrete, cement or other flowable materials to remote locations would provide a more effective means for delivering and dispensing of concrete within the setup time of the material, would accommodate delivery over variable terrain, and would significantly improve upon the use of human and material resources.

SUMMARY OF THE INVENTION

An object of the invention includes provision of an improved hopper and a method for the delivery and discharge of a flowable material (e.g., concrete, cement, sand, gravel, polymer etc.) to remote locations.

The present invention comprises a hopper for the delivery and discharge of a flowable material. A generally rectangular hopper has a back vertical wall, a front vertical wall, a first and second upper side wall, a first and second lower side wall, a bottom wall, and a top hopper opening for receiving flowable material into said hopper. The lower side walls converge inwardly and downwardly and are joined to the bottom wall. At least one mounting bracket is mounted on the exterior of said back vertical wall for securing said container to the arm of a transport vehicle. Preferably, an upper mounting bracket and a lower mounting bracket are mounted on the exterior of said back vertical wall. The front vertical wall includes a discharge chute. The opening of the chute is centrally located on the lower portion of the front vertical wall that is located equidistant between the downwardly and inwardly converging first and second lower sidewalls. A discharge door controls the flow of said flowable material through the discharge opening to the discharge chute. An anti-spill lip, the perimeter of which defines the hopper opening, is angled between 30° to 90° inwardly from the vertical planes of the front, back and upper side walls towards the top hopper opening.

DETAILED DESCRIPTION OF THE INVENTION

Figure 3:
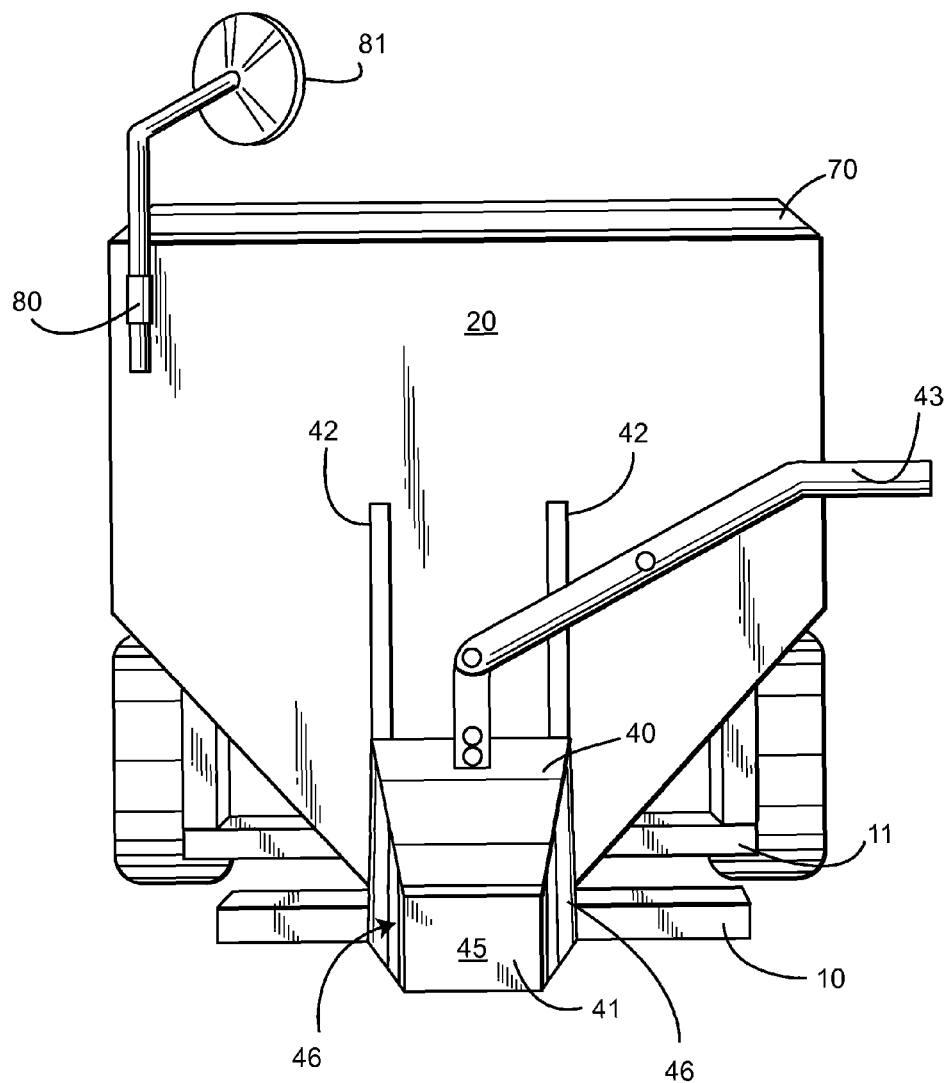
FIG. 3 is an exterior front view of the hopper apparatus of the present invention.
Figure 4:
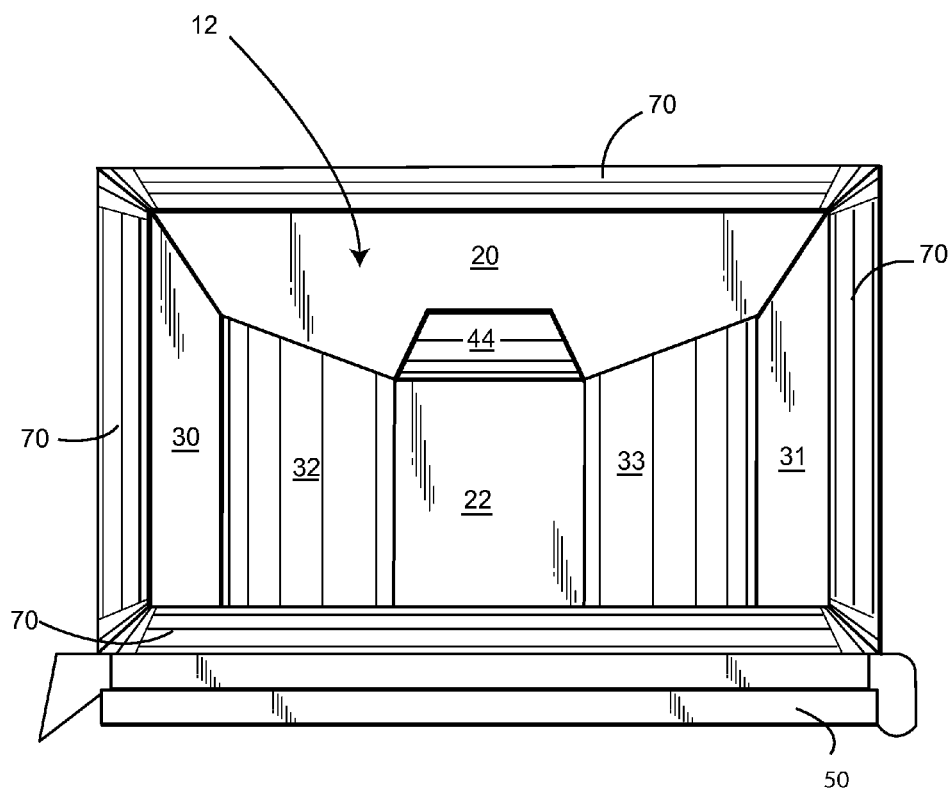
FIG. 4 is a top side view of the hopper apparatus showing the interior of the hopper of the present invention.

The hopper has a top opening (12) adapted to receive flowable material (e.g., concrete, cement, sand, gravel, polymer etc.). The upper portion of the hopper is generally rectangular and is formed of four vertical walls. The upper portion of the hopper is generally about the upper half of the hopper. However, depending on the size of the hopper, the upper portion of the hopper may be from ⅓ to ⅔ of the height of the hopper. Opposing front vertical and back vertical walls (20, 21) are generally parallel to each other and opposing first and second upper side walls (30, 31) are generally parallel to each other. Approximately one half of the way down the height of the hopper, the opposing first and second upper side walls (30, 31) which are vertical, transition into opposing first and second lower side walls (32, 33) which converge downwardly and inwardly toward one another until they join the hopper bottom plate (22). Having lower side walls which converge both inwardly and downwardly allows gravity to efficiently direct the flowable material to a discharge opening (44) which is located in the front of the hopper at the center of the lower half of the front vertical wall (20). While the chute opening is shown in FIGS. 3 and 4 to be generally centered on the front vertical wall (20) and between lower opposing sidewalls it is anticipated that other applications may suggest that the chute opening be located off center. Thus, in an alternative embodiment the delivery chute is off center. The perimeter of the bottom plate (22) is joined to the bottom of the front vertical wall (20), the bottom of the back vertical wall (21) and the bottom of the opposing lower side walls (32, 33). The bottom plate (22) is perpendicular to the front and back walls (20, 21). The discharge opening (44) aligns with a discharge chute (41) which has a bottom (45) and sidewalls (45, 46). The bottom of the discharge opening (44) is generally on plane with the hopper bottom plate (22). Preferably, the discharge opening (44) is about 7-15 inches in height and about 6 to 15 inches in width. The discharge chute (41) extends downwardly away from the discharge opening (44). The angle of the discharge chute (41) can vary and depends upon the desired length. Typically, the chute will extend about 6 to 16 inches from the discharge opening until approximately ground level. A sliding discharge door (40) which slides within sliding channels (42) is attached on the lower half of the front vertical wall (20) and is adapted to cover the discharge opening (44). The sliding discharge door (40) and the sliding channels (42) are parallel to the front vertical wall (20). A handle mechanism (43) is attached to the sliding door (40). The handle allows the operator to open and close the discharge door (40). During operation, the discharge door (40) is maintained in a closed position thus retaining the contents within the hopper until selectively actuated by an operator at the determined content delivery location. The front location of the discharge chute (41) enables the loader operator to visually align the discharge chute (41) over the target and permits him/her to observe the location of the discharge chute (41) without the aid of others. A single loader operator can effectively perform a task that heretofore required more than one person. To this end, attached to the outside upper portion of the front vertical wall (20) is a bracket (80) adapted to receive an angled mirror attachment (81) which allows the loader operator to maintain a direct observation of the orientation of the discharge chute (41). However, the bracket (80) and angled mirror (81) can also be positioned on any other portion of the hopper that allows the loader operator to view and align the discharge chute (41) while seated in the loader.

Figure 1:
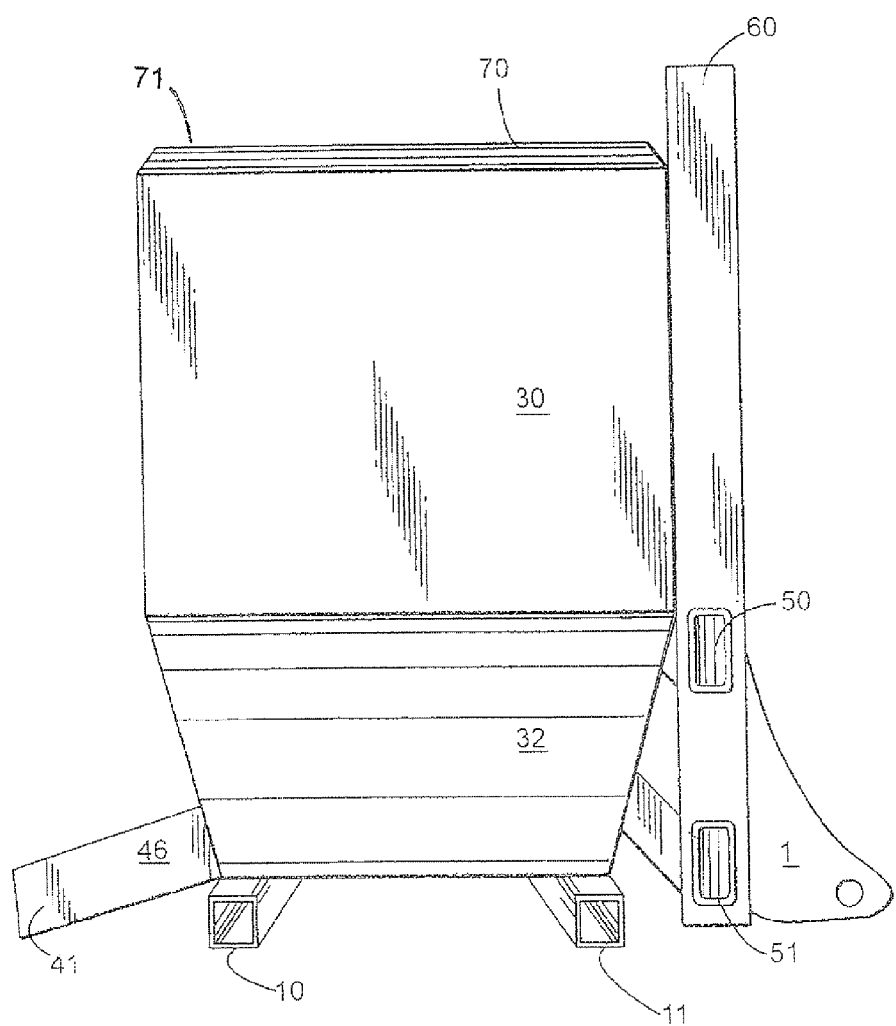
FIG. 1 is an exterior side view depicting the hopper apparatus of the present invention coupled to the front arms of a skid loader.

An anti-spill lip (70) is formed around at least one side of the perimeter of the hopper top opening (12). The anti-spill lip acts to prevent flowable contents from sloshing over the hopper sides during transport to a delivery site. Preferably, the anti-spill lip (70) is angled between about 30° and 90° inwardly from the vertical plane of the front vertical wall (20) towards the top opening (12). Most preferably, the anti-spill lip (70) extends around the entire perimeter of the hopper and is angled between about 30° and 90° inwardly from the vertical plane of the front, back and side walls (20, 21, 30, and 31) towards the top opening (12). More preferably, the anti-spill lip is angled 40-50° inwardly from the vertical plane of the upper walls and extends around the entire perimeter. As depicted in FIG. 1, in extreme rough terrain the hopper may also be fitted with a lid (71) mechanism to isolate its contents from environmental elements and to prevent its contents from sloshing over its sides during transport to a remote delivery site. Preferably, the perimeter of the hopper top opening (12) is at least 50% greater than the perimeter of the bottom plate (22). Most preferably, the perimeter of the anti-spill lip (70) is at least 60% greater than the perimeter of the bottom plate (22). The perimeter of the bottom plate (22) is joined to the bottom of the front vertical wall (20), the opposing lower side walls (32, 33) and the back vertical wall (21).

The hopper bottom plate (22) is supported by a front lower hopper frame member (10) and back, lower hopper frame members (11) which are parallel to and sit near or below the bottom plate (22). Frame members (10) and (11) are adapted to rest on the ground. First and second vertical frame members (60, 61) are attached to and parallel to the back wall (21). The bottom of each vertical frame member (60, 61) may be joined to the back hopper frame member (11) or alternatively may be joined to the back vertical wall (21).

Two horizontal members, the upper mounting bracket (50) and the lower mounting bracket (51), are attached horizontally between the vertical frame members (60, 61). Preferably, the bottom of the lower mounting bracket (51) is positioned at about the hopper bottom plane and the upper mounting bracket is situated at or below the plane where the upper side walls (30, 31) transition to the inwardly sloping lower side walls (32, 33). Preferably, the top of the upper mounting bracket (50) is situated from 18-26" off the ground. Most preferably, the top of the upper mounting bracket (50) is situated from 19-25" off the ground. Even more preferably the top of the upper mounting bracket is situated 19-21" from the bottom of the hopper. The upper and lower mounting brackets (50, 51) are adapted to engage and couple with the articulated arm of a loader. In some loaders with operator enclosures, the loader arm must be at ground level in order to open the operator enclosure door. In such cases, the mounting brackets are positioned so that the when the loader arm is engaged with the mounting brackets it is able to fully lower to ground level, thus allowing the loader operator to open the enclosure door. Surprisingly, positioning the mounting brackets (50, 51) below the midpoint of the hopper also increases the stability and handling of the loaded hopper while in transit. When the mounting brackets (50, 51) are hooked into or engaged with the loader arm(s) (1), locking pins (not shown) may be inserted into locking pin retainers, for captively retaining the hopper to the front arm (1) of a loader.

It is anticipated that the body of the hopper will be constructed of metal having a gage suitable for retaining cargo such as concrete which can weigh several tons. It is also anticipated that the interior surface of the hopper may be covered with a coating to prevent adhesion thereto by the flowable materials contained therein and that such a coating would also promote the gravity-fed flow of the materials from the interior of the hopper to the discharge chute. It is additionally anticipated that the gravity fed flow of materials from the hopper may be assisted by mechanical or vibrational means.

Figure 2:
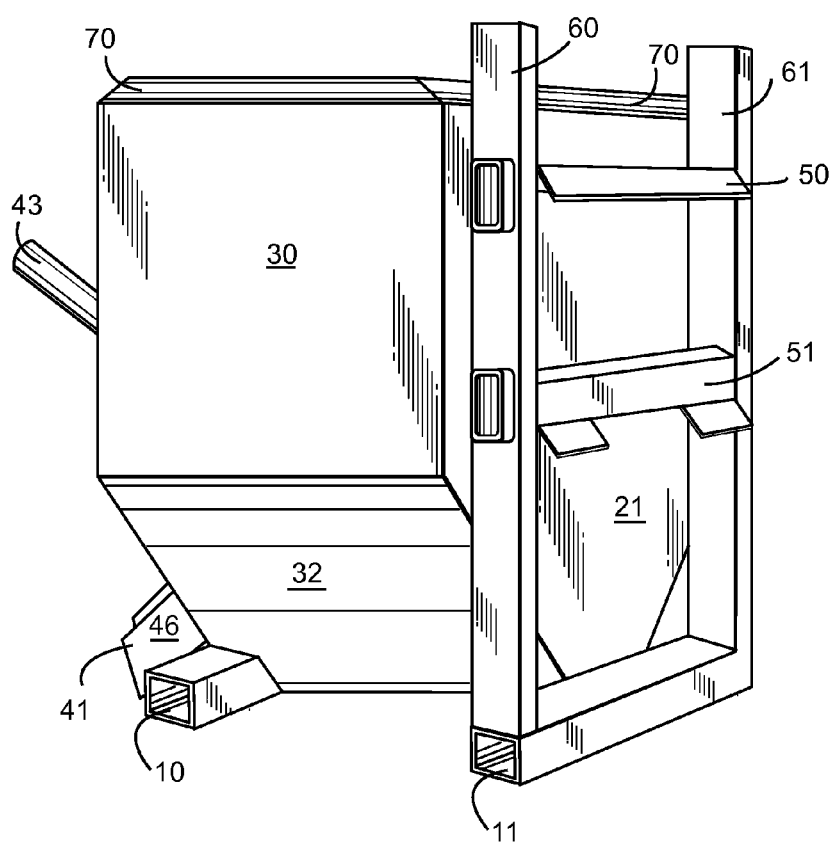
FIG. 2 is an exterior rear angle side view of the apparatus of the present invention.
Figure 5:
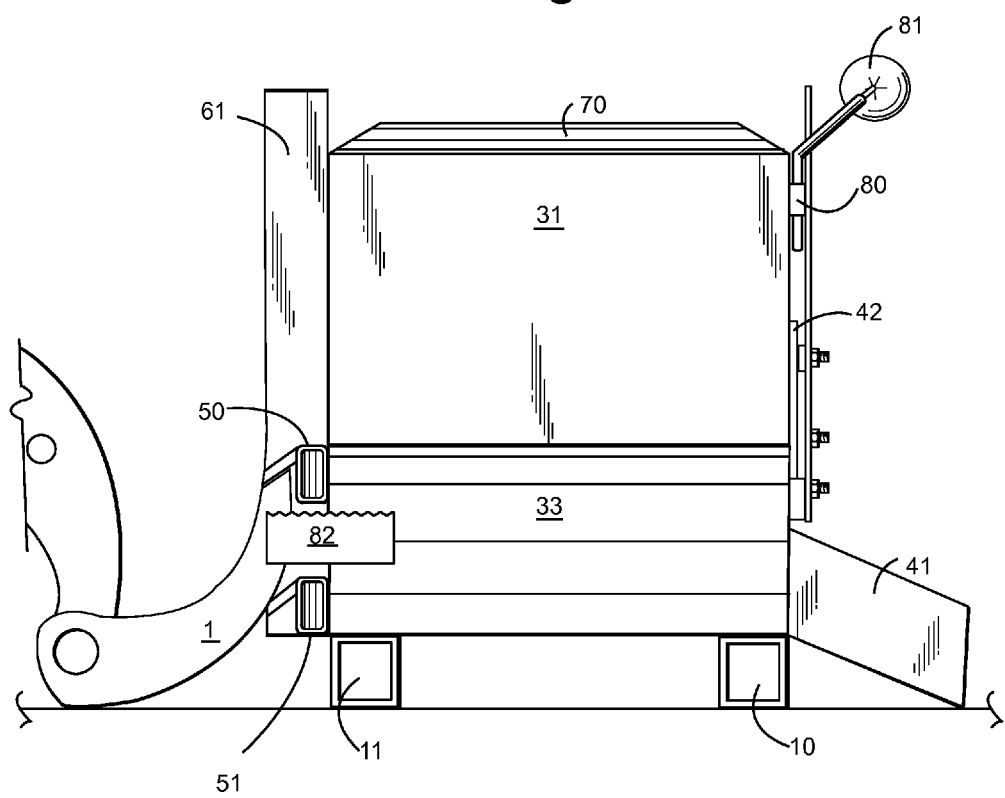
FIG. 5 is a side view of the hopper apparatus showing a preferred placement of the upper and lower mounting brackets.

It is also anticipated that in case where a larger loader vehicle can be used the hopper of the present invention can be adapted based on the teaching herein to accommodate a larger load of flowable material. The hopper of the present invention can be adapted to accommodate up to 9 Cubic yards of concrete, for example. In certain embodiments, the upper and lower mounting brackets can be mounted higher on the vertical back wall, such as can be seen in FIG. 2. However, in most cases it is desirable to mount the upper and lower mounting brackets so that a loader arm can fully rest on the ground while still engaged with the mounting bracket, as seen in FIGS. 1 and 5 which depict side views of preferred embodiments of the present invention. Upper and lower mounting brackets (50, 51) are attached between the first and second rear vertical frame members (60, 61) on the lower half of the back vertical wall ((21). As can been seen, the placement of the mounting brackets allows the loader arm to be fully lowered and rest on or near ground level. In FIG. 5, a stepping plate is attached to the vertical frame member. The stepping plate may be grooved, notched, or roughened on the top. This roughening provides a secure gripping surface for a boot or shoe. An operator can view the inside of the hopper while stepping on the stepping plate.

During operation, a hopper coupled to a skid loader (or other vehicle) will be presented to a cement/concrete truck (not shown in Figures) to receive a load of concrete or other flowable material. The hopper resting on the lower frame members (10, 11) is filled with flowable material. Once loaded, the hopper is raised by loader arm (1) and then moved into a position by a skid loader or the like. Once at the delivery site, the delivery chute of the hopper is positioned by the operator above the desired position (e.g., form, footer, hole etc.) which is to be filled with the flowable material. After the delivery chute has been properly aligned over the delivery position, the operator lowers the hopper via the loader arm. The mirror can be used to assist in visualizing the alignment of the delivery chute with the delivery location.

The ability to articulate the front arm (1) of skid loader allows a loaded hopper to be tilted forward during a hill climb thus shifting the center of gravity forward. This makes a hill climb by skid loader bearing a loaded hopper much easier. Furthermore, the anti-spill lip (70) prevents the load from spilling over the sides of the hopper when the hopper is inclined or when the skid steer encounters rough terrain.

From the foregoing description, one skilled in the art can easily ascertain the essential characteristics of this invention and, without departing from the spirit and scope thereof, can make various changes and modifications of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

I claim:

1. A hopper for the delivery and discharge of a flowable material comprising
   a rectangular hopper having a back vertical wall, a front vertical wall, a first and second vertical upper side wall, a first and second lower side wall, a bottom plate, and a top hopper opening for receiving flowable material into said hopper, said lower side walls converge inwardly and downwardly and are joined to the bottom plate,
   said bottom plate is perpendicular to said back vertical wall and
   an upper mounting bracket mounted on the exterior of said back vertical wall for securing said container to the arm of a transport vehicle,
   said front vertical wall including a discharge chute located on the lower portion of the front vertical wall that is located equidistant between the downwardly and inwardly converging first and second lower sidewalls and a discharge door for controlling the flow of said flowable material through said discharge chute,
   and an anti-spill lip the perimeter of which defines the hopper opening, said anti-spill lip is angled between 30° to 90° inwardly from the vertical planes of the front vertical wall, back vertical wall and upper side walls towards the top hopper opening.

2. The hopper of claim 1, further comprising a lower mounting bracket mounted on the exterior of said back vertical wall.

3. The hopper of claim 1, wherein said discharge chute has an opening (44) that is about 7-15 inches in height and about 6 to 15 inches in width.

4. The hopper of claim 1, wherein said anti-spill lip is angled 40-50° inwardly from the vertical plane of the upper walls and extends around the entire perimeter.

5. The hopper of claim 1, further comprising a lid (71) covering the top opening.

6. The hopper of claim 1, wherein said hopper top opening (12) is at least 50% greater than the perimeter of the bottom plate (22).

7. The hopper of claim 1, wherein the perimeter of the anti-spill lip (70) is at least 60% greater than the perimeter of the bottom plate (22).

8. The hopper of claim 1, further comprising a mirror mounting bracket attached to the outside upper portion of the front vertical wall (20) that is adapted to receive an angled mirror attachment (81) which allows the loader operator to maintain a direct observation of the orientation of the discharge chute (41).

9. A hopper for the delivery and discharge of a flowable material comprising
   a rectangular hopper having a back vertical wall, a front vertical wall a first and second vertical upper side wall, a first and second lower side wall, a bottom plate, and a top hopper opening for receiving flowable material into said hopper, said lower side walls converge inwardly and downwardly and are joined to the bottom plate, said bottom plate is perpendicular to said back vertical wall, and an upper and lower mounting bracket mounted on the exterior of said back vertical wall for securing said container to the arm of a transport vehicle, wherein said upper mounting bracket is situated from 18-26" off the ground, said front vertical wall including a discharge chute located on the lower portion of the front vertical wall that is located equidistant between the downwardly and inwardly converging first and second lower sidewalls and a discharge door for controlling the flow of said flowable material through said discharge chute, and an anti-spill lip the perimeter of which defines the hopper opening, said anti-spill lip is angled between 40° to 80° inwardly from the vertical planes of the front vertical wall, back vertical wall and upper side walls towards the top hopper opening.

10. The hopper of claim 9, wherein said discharge chute has an opening (44) that is about 7-15 inches in height and about 6 to 15 inches in width.

11. The hopper of claim 9, wherein said anti-spill lip is angled 40-50° inwardly from the vertical plane of the upper walls and extends around the entire perimeter.

12. The hopper of claim 9, further comprising a lid.

13. The hopper of claim 9, wherein said hopper top opening (12) is at least 50% greater than the perimeter of the bottom plate (22).

14. The hopper of claim 9, wherein the perimeter of the anti-spill lip (70) is at least 60% greater than the perimeter of the bottom plate (22).

15. The hopper of claim 9, further comprising a mirror mounting bracket attached to the outside upper portion of the front vertical wall (20) that is adapted to receive an angled mirror attachment (81) which allows the loader operator to maintain a direct observation of the orientation of the discharge chute (41).

* * * * *